United States Patent
Ohyama

(10) Patent No.: US 9,386,237 B2
(45) Date of Patent: Jul. 5, 2016

(54) IMAGE PICKUP APPARATUS AND IMAGE PICKUP METHOD

(71) Applicant: CANON KABUSHIKI KAISHA, Tokyo (JP)

(72) Inventor: Nana Ohyama, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/702,471

(22) Filed: May 1, 2015

(65) Prior Publication Data

US 2015/0326797 A1 Nov. 12, 2015

(30) Foreign Application Priority Data

May 8, 2014 (JP) ................. 2014-097151

(51) Int. Cl.
*H04N 5/228* (2006.01)
*H04N 5/208* (2006.01)
*H04N 5/21* (2006.01)
*H04N 5/265* (2006.01)
*H04N 5/232* (2006.01)
*G06K 9/46* (2006.01)
*G06T 5/00* (2006.01)
*G06T 5/10* (2006.01)
*G06T 7/00* (2006.01)

(52) U.S. Cl.
CPC .............. *H04N 5/265* (2013.01); *G06K 9/4604* (2013.01); *G06T 5/002* (2013.01); *G06T 5/10* (2013.01); *G06T 7/0085* (2013.01); *H04N 5/23293* (2013.01)

(58) Field of Classification Search
CPC ....... G06T 7/0083; G06T 7/0085; G06T 3/00; G06T 7/0002; G06T 5/00; G06T 2207/20192; G06T 5/003; G06K 9/48; G06K 9/4604; G01N 21/8851; G01N 21/8806; G01N 21/95692; G01N 21/93; G01B 11/00; G02B 26/10; H04N 5/2622; H04N 1/409; H04N 1/58; H04N 1/4092; H04N 7/0142
USPC ............ 348/222.1, 252, 625, 333.01–333.13
See application file for complete search history.

(56) References Cited

U.S. PATENT DOCUMENTS 4,030,121 A * 6/1977 Faroudja ................. H04N 5/208 327/170
4,847,681 A * 7/1989 Faroudja ................. H04N 5/208 348/625
5,200,824 A * 4/1993 Kageyama ............... H04N 5/21 348/607

(Continued)

FOREIGN PATENT DOCUMENTS

JP 2010-50592 A 3/2010

*Primary Examiner* — Chia-Wei A Chen
(74) *Attorney, Agent, or Firm* — Canon USA, Inc., IP Division

(57) ABSTRACT

An image processing device performs image processing on an image being captured to display the image on a display unit having a resolution lower than a resolution of the image. The image processing device includes an extraction section that extracts an edge component from the image, an edge enhancing section that enhances the edge component by performing low-pass filter processing on the edge component after performing full-wave rectification processing on the edge component, a combining section that combines the enhanced edge component with the image to generate a composite image, and a resolution conversion section that performs resolution conversion of the composite image to match a resolution of the composite image with the resolution of the display unit.

7 Claims, 8 Drawing Sheets

(56) References Cited

U.S. PATENT DOCUMENTS 6,597,407 B1 * 7/2003 Taketani ................ H04N 5/142
　　　　　　　　　　　　　　　　　　　　348/625

8,605,091 B2 * 12/2013 Bradbury ................ G09G 5/00
　　　　　　　　　　　　　　　　　　　　345/30
2010/0098293 A1 * 4/2010 Chandraker ............ G06K 9/32
　　　　　　　　　　　　　　　　　　　　382/103

* cited by examiner

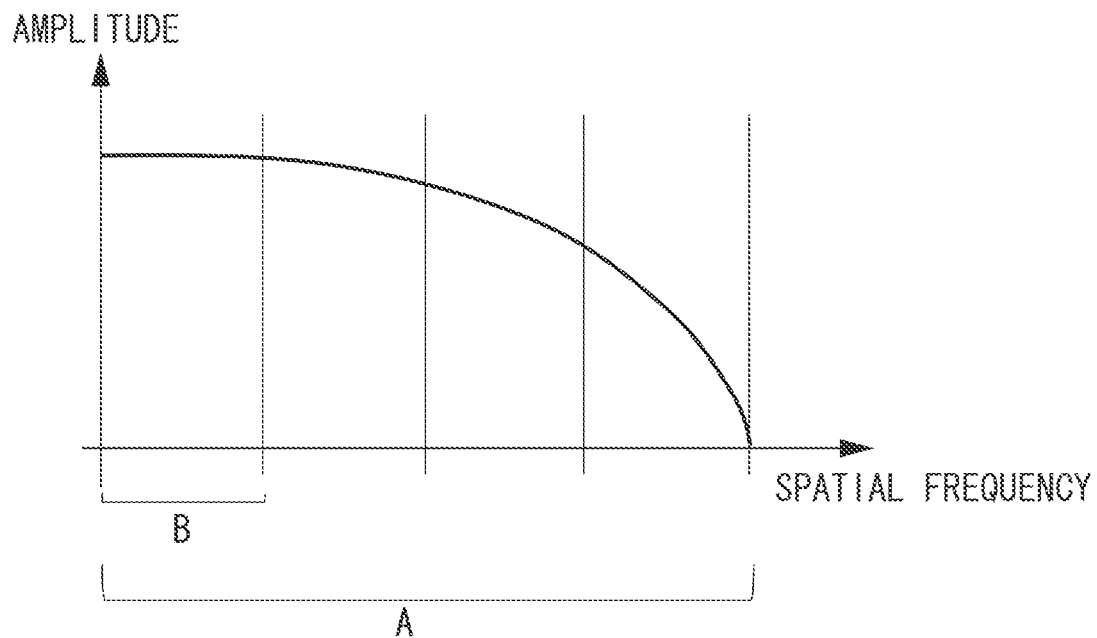
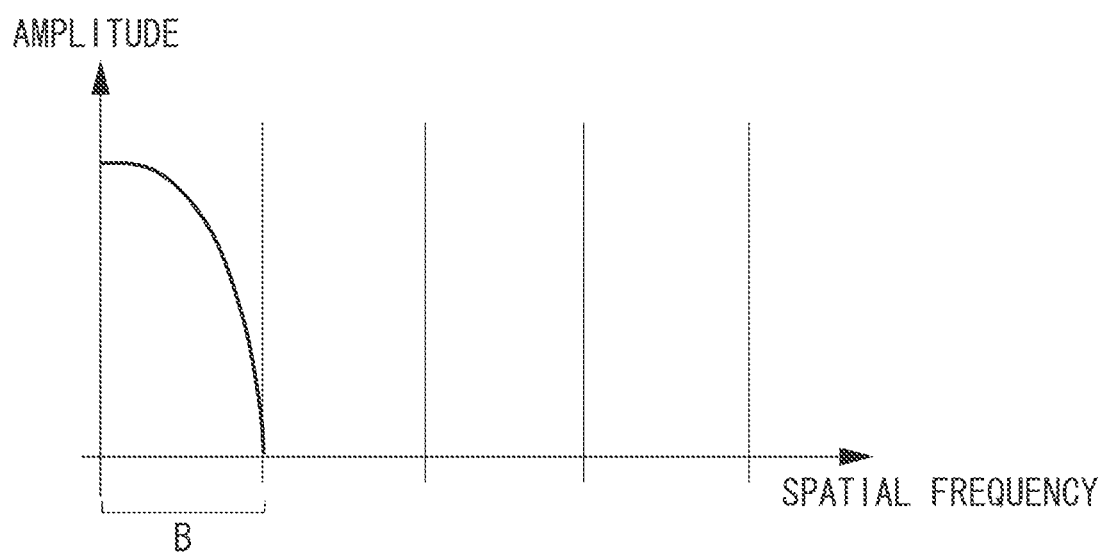

HIGH-PASS FILTER OUTPUT

AFTER NOISE REDUCTION

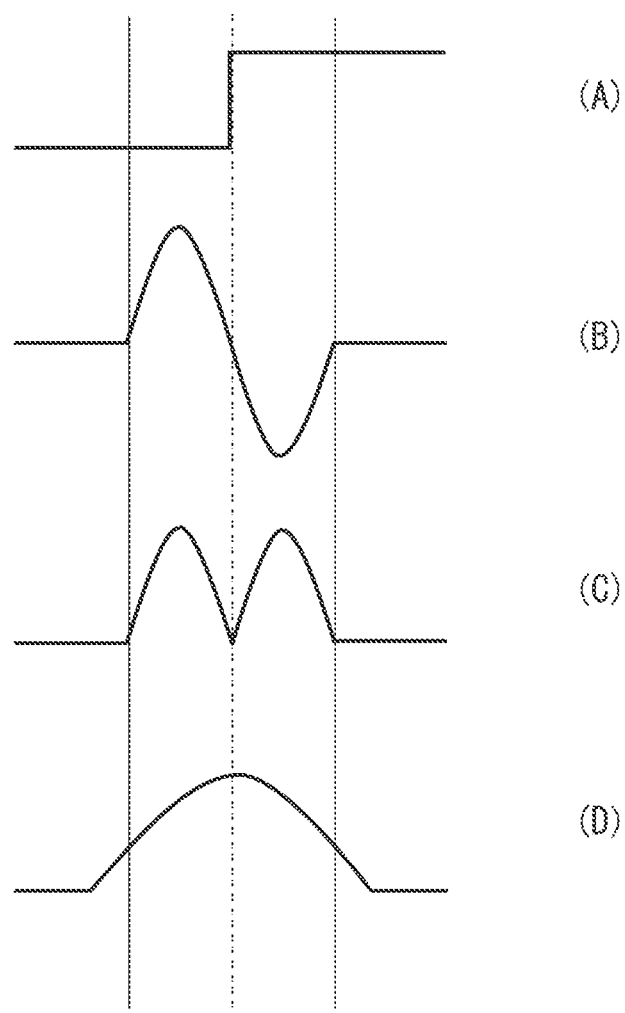

FIG. 7

| | COMPONENT EXCEPT FOR EDGE | EDGE COMPONENT |
|---|---|---|
| MODE 1 | COLOR IMAGE | MONOCHROME EDGE |
| MODE 2 | COLOR IMAGE | COLOR EDGE |
| MODE 3 | MONOCHROME IMAGE | MONOCHROME EDGE |
| MODE 4 | MONOCHROME IMAGE | COLOR EDGE |

IMAGE PICKUP APPARATUS AND IMAGE PICKUP METHOD

BACKGROUND OF THE INVENTION

1. Field of the Invention

The present invention relates to a technique for displaying an image on a display device after subjecting the image being captured to image processing for emphasizing an edge component in the image, to assist users in adjusting the focus during shooting.

2. Description of the Related Art

In general, a photographer checks an image being captured and displayed on a display device such as an electronic viewfinder (EVF) attached to an image pickup apparatus in focusing on a subject during shooting. One way of assisting this focusing is peaking display, which is a technique for displaying an image with an emphasized edge component or displaying an image with a colored edge component as discussed in Japanese Patent Application Laid-Open No. 2010-50592. A photographer can recognize the degree of in-focus by checking an image displayed by means of the peaking display.

In recent years, image pickup elements capable of picking up images at a 4K resolution (3840×2160 pixels) have become available and have evolved into shooting systems capable of handling finer images. Meanwhile, display devices such as an EVF attached to an image pickup apparatus have not been improved to the extent to display such images at fine resolution as compared with the image pickup elements, and often use resolutions on the level of only quarter high definition (qHD) (960×540 pixels).

FIGS. 3A and 3B are diagrams illustrating frequency characteristics related to image processing in a conventional image pickup apparatus. Area A of FIG. 3A indicates, for example, a frequency band of an image captured in 4K resolution, and areas B of FIGS. 3A and 3B indicate, for example, a frequency band of an image that can be displayed in a display device of qHD resolution. As apparent from FIGS. 3A and 3B, when the resolution of the display device is lower than the resolution of the image pickup apparatus, it is necessary to perform resolution conversion so that the resolution of a captured image is reduced to match with the resolution of the display device.

In a process of the resolution conversion in the conventional image pickup apparatus, a high-frequency edge component included in a captured image disappears in a filtering process and therefore, the peaking display cannot be appropriately performed. It may be conceivable to thin an extracted high-frequency edge component and display the thinned image on a display device having a low resolution. However, aliasing occurs due to the thinning.

SUMMARY OF THE INVENTION

The present invention features, among other things, an image processing device capable of appropriately emphasizing an edge component of an image being captured, even when the image is displayed by a display device having a resolution lower than the resolution at which an image-pickup unit can capture an image, allowing users to set focus more accurately.

According to an aspect of the present invention, an image pickup apparatus includes an image-pickup unit configured to capture an image, a display unit configured to display the image at a resolution lower than the resolution at which the image-pickup unit can capture the image, and an image processing unit configured to perform image processing for allowing the image being captured, to be displayed by the display unit, wherein the image processing unit includes an extraction section that extracts an edge component from the image, an edge processing section that performs processing for enhancing the edge component, by performing low-pass filter processing on the edge component after performing full-wave rectification processing on the edge component, a combining section that combines the enhanced edge component with the image to generate a composite image, and a resolution conversion section that performs resolution conversion of the composite image, to match a resolution of the composite image with the resolution of the display unit.

Further features of the present invention will become apparent from the following description of exemplary embodiments with reference to the attached drawings.

BRIEF DESCRIPTION OF THE DRAWINGS

FIGS. 3A and 3B are diagrams illustrating frequency characteristics according to conventional image processing.

FIG. 5 is a diagram illustrating an image of edge enhancement according to the present exemplary embodiments.

FIG. 7 is a diagram illustrating a color mode of peaking according to a second exemplary embodiment.

DESCRIPTION OF THE EMBODIMENTS

Exemplary embodiments of the present invention will be described in detail below with reference to the drawings. An image processing device according to each of the exemplary embodiments of the present invention is used for a digital camera serving as an image pickup apparatus capable of capturing a still image and a moving image, and outputs an image to a display device attached to the image pickup apparatus.

Figure 1:
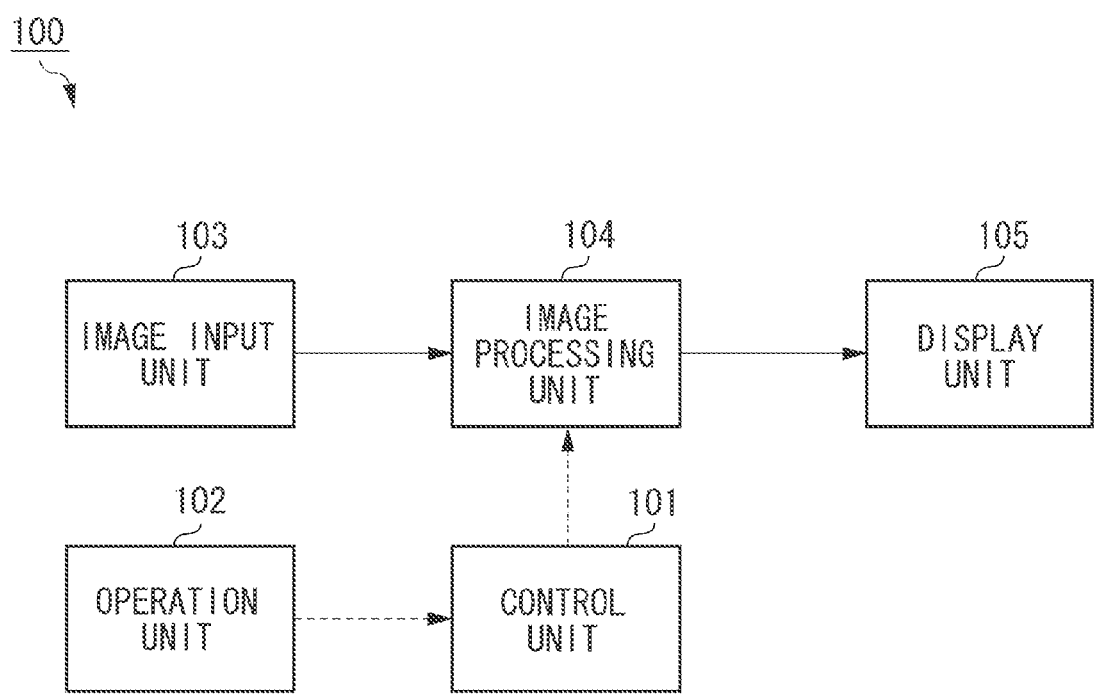
FIG. 1 is a block diagram illustrating a configuration example of an image processing device according to exemplary embodiments of the present invention.

A first exemplary embodiment of the present invention will be described below. FIG. 1 is a block diagram illustrating a configuration example of an image pickup apparatus 100 according to the first exemplary embodiment of the present invention.

The image pickup apparatus 100 illustrated in FIG. 1 includes a control unit 101, an operation unit 102, an image input unit 103, an image processing unit 104, and a display unit 105. The image input unit 103 includes an image pickup section. The image pickup apparatus 100 has the following function. The image pickup section of the image input unit 103 obtains image information by picking up an image of a subject. The image processing unit 104 performs image processing on the obtained image information and then outputs an image resulting from the image processing to the display unit 105. The control unit 101, which includes a central processing unit (CPU) and a memory for storing a control program to be executed by the CPU, controls the entire processing of the image pickup apparatus 100 including the image processing unit 104.

The operation unit 102 includes input devices such as keys, buttons, or a touch panel, by which a user provides instructions to the image pickup apparatus 100. Operation signals from the operation unit 102 are detected by the control unit 101, and then controlled by the control unit 101 so that the image pickup apparatus 100 operates according to operation performed by the user.

The display unit 105 is a display device such as a liquid crystal display (LCD) provided in the image pickup apparatus 100 to display various kinds of information such as an input image and a menu screen. The display unit 105 is, for example, a liquid crystal electronic viewfinder (EVF), which is attached to the image pickup apparatus 100.

The image input unit 103 includes an image pickup section configured of, for example, a plurality of lenses and an image pickup element such as a charge-coupled device (CCD). Alternatively, the image input unit 103 may be an interface section to which an image output from an external device or the like can be input. An image (a video image) input to the image input unit 103 is subjected to the image processing by the image processing unit 104, and then displayed by the display unit 105.

In the present exemplary embodiment, the resolution of an image to be picked up by the image pickup section of the image input unit 103 is assumed to be 4K (horizontal 4096× vertical 2160 pixels), and the display resolution of the display unit 105 is assumed to be qHD (horizontal 960×vertical 540 pixels).

The image processing unit 104 performs peaking processing on the image input from the image input unit 103 for emphasizing an edge component of the image, and then generates an image that can be displayed by the display unit 105.

The display unit 105 receives the image output from the image processing unit 104 and displays the received image. The display unit 105 can also display an image captured by the image pickup section. The user adjusts the focus by checking the image being captured and displayed on the display unit 105 during shooting.

Figure 2:
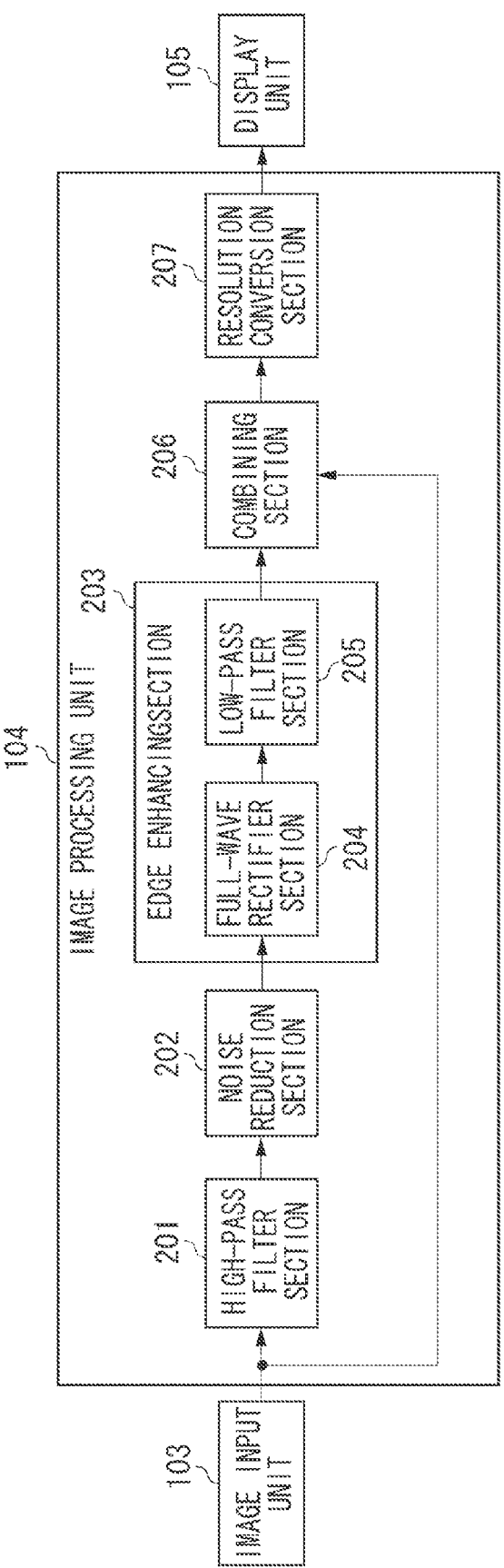
FIG. 2 is a block diagram illustrating a configuration example of an image processing unit according to the present exemplary embodiments.

FIG. 2 is a block diagram illustrating a configuration example of the image processing unit 104 according to the first exemplary embodiment of the present invention.

A high-pass filter section 201 functioning as an edge-component extraction section, and extracts an edge component from the image input by the image input unit 103. The edge component is a high-frequency component of the image.

A noise reduction unit 202 removes noise such as an isolated point and a low-level edge component from the extracted edge component. More specifically, a predetermined threshold is set to the level of the extracted edge component output from the high-pass filter section 201, and the noise reduction unit 202 removes an edge component falling within a designated level range as the noise.

Figure 4A:
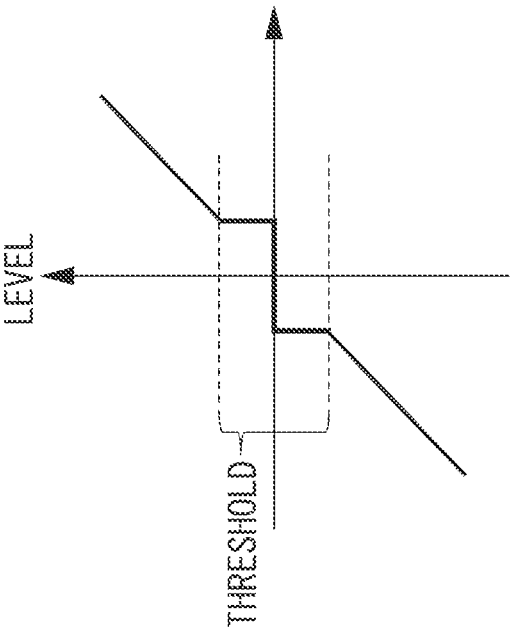
FIGS. 4A and 4B are diagrams illustrating an image of noise removing processing according to the present exemplary embodiments.
Figure 4B:
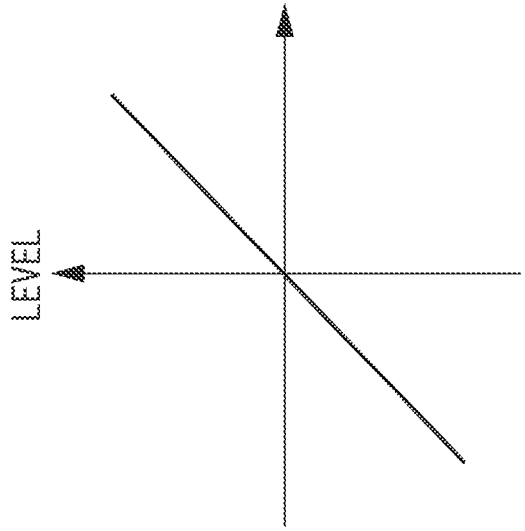

FIGS. 4A and 4B are diagrams illustrating an image representing the removal of noise from an edge component.

FIG. 4A illustrates the level of a signal output from the high-pass filter section 201, and FIG. 4B illustrates a result of removing an edge component falling within the designated level range as the noise when "0" is set as the threshold. The user can freely designate this level range of the edge component to be removed.

An edge enhancing section 203 includes a full-wave rectifier section 204 and a low-pass filter section 205. The full-wave rectifier section 204 performs full-wave rectification processing on positive and negative components of the edge component to rectify the both components to the same direction. In the present exemplary embodiment, the full-wave rectifier section 204 rectifies the edge component in a positive direction. The low-pass filter section 205 can enhance the edge component by performing low-pass filter processing on this rectified edge component.

FIG. 5 illustrates an image representing enhancement of an edge component.

Part (A) of FIG. 5 illustrates a part of an image including an edge component of a 4K input image. Part (B) of FIG. 5 illustrates an edge component extracted by a high-pass filter. Part (C) of FIG. 5 illustrates a waveform obtained after full-wave rectification in the positive direction has been performed on the edge component. Part (D) of FIG. 5 illustrates the edge component enhanced when the waveform after carrying out the full-wave rectification has passed through a low-pass filter. An edge component can be enhanced by sequentially performing these processing steps, i.e., an edge component existing in a high-frequency range as a spatial frequency can be shifted to a lower-frequency range.

A combining section 206 combines the enhanced edge component output from the edge enhancing section 203 with the image input from the image input unit 103 such that horizontal and vertical timings of the image match with each other. More specifically, the combining section 206 performs an addition process for adding the edge component to a luminance component of the image input from the image input unit 103, to generate a composite image.

A resolution conversion section 207 performs resolution conversion processing on the composite image by using a low-pass filter such that the image can be displayed on the display unit 105 which has a resolution lower than the resolution of an image to be captured by the image pickup element. In the present exemplary embodiment, resolution conversion is performed to convert an image of 4K-pixel resolution to an image of qHD-pixel resolution. Therefore, the resolution conversion section 207 downconverts a horizontal size from 3960 pixels to 960 pixels, and a vertical size from 2160 pixels to 540 pixels.

The image of qHD resolution output from the resolution conversion section 207 is an output image from the image processing unit 104. The display unit 105 displays the output image.

Next, operation performed by the image processing unit 104 will be described with reference to FIG. 6.

Figure 6:
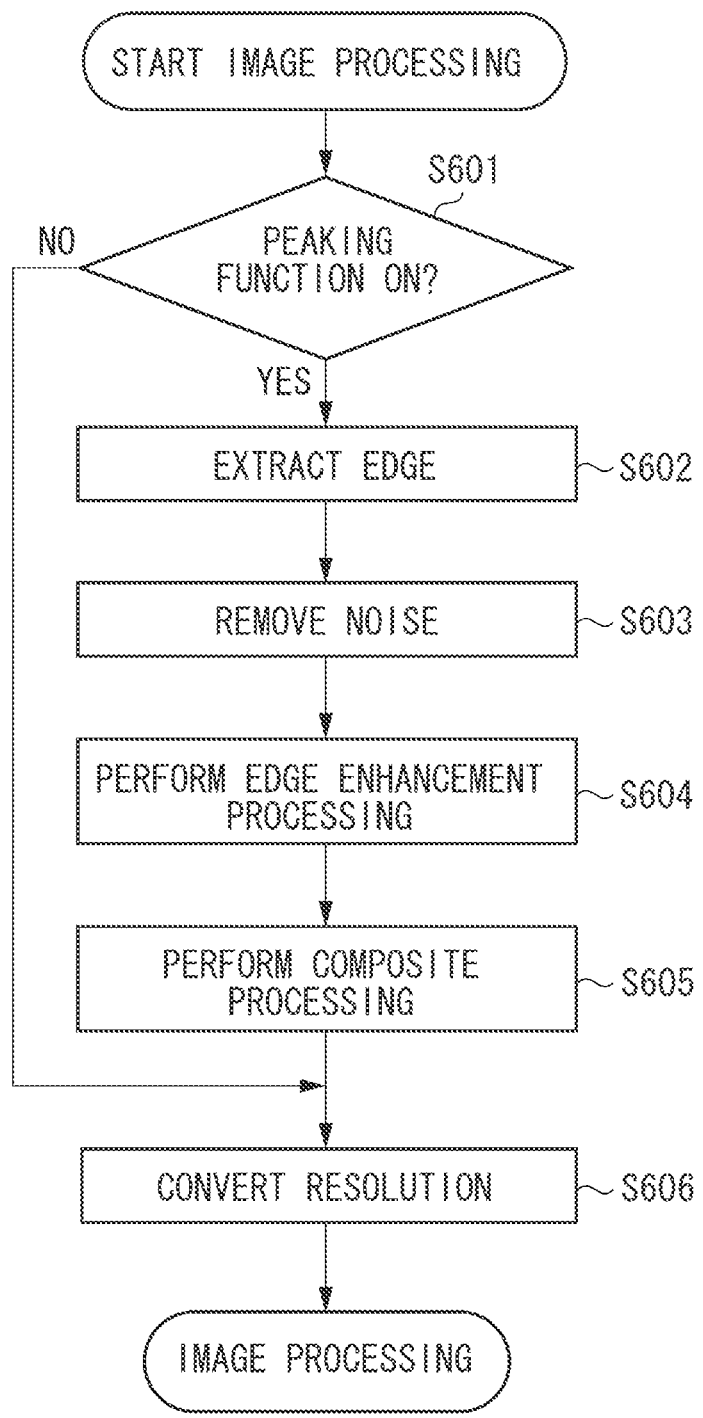
FIG. 6 is a flowchart of image processing according to the present exemplary embodiments.

FIG. 6 illustrates a flowchart according to the peaking processing of the present exemplary embodiment. The flowchart in FIG. 6 represents a processing procedure to be executed by the control unit 101 controlling each processing block. More specifically, programs stored in a memory (a read only memory (ROM)) included in the control unit 101 are decompressed into another memory (a random access memory (RAM)), and the CPU of the control unit 101 executes the programs to implement the processing.

In step S601, if a peaking display function that displays an input image after emphasizing an edge component of the input image is enabled in FIG. 6 (Yes in step S601), then in step S602, the high-pass filter section 201 extracts an edge component of the input image. Next, in step S603, the noise reduction unit 202 removes a noise component from the extracted edge component. The operation then proceeds to step S604 to perform edge enhancement processing.

In the edge enhancement processing in step S604, the full-wave rectifier section 204 rectifies the edge component, and then the low-pass filter section 205 filters the rectified edge component, so that an enhanced edge component is generated. In step S605, the combining section 206 combines the enhanced edge component with the input image, which is a reference image from which the edge component is extracted to generate a composite image having an emphasized edge. Next, in step S606, the resolution conversion section 207 converts the resolution of the composite image to the resolution which can be displayed on the display unit 105.

On the other hand, when the peaking display function of displaying an input image after emphasizing an edge component of the input image is disabled in FIG. 6 (No in step S601), the operation proceeds to step S606 without performing edge emphasis processing. In step S606, the resolution conversion section 207 converts an input image with a 4K resolution into an image with qHD resolution, which can be displayed on the display unit 105.

A second exemplary embodiment of the present invention will be described below. In the first exemplary embodiment, the combining section 206 performs the adding process for adding the enhanced edge component only to the luminance component when combining the enhanced edge component with the input image. This input image is a reference image from which the edge component is extracted.

In the second exemplary embodiment, two modes are provided in a state where a peaking display function is ON. In one mode a captured image having an emphasized edge is displayed on a display unit 105 with coloring in an enhanced edge component. In the other mode, an image excluding an edge component is displayed in monochrome. Image composite processing in four color modes of the peaking display function, which combine these two modes, will be described. Of an image processing device in the present exemplary embodiment, configurations common to those of the image processing device in the first exemplary embodiment will be not described.

The four modes, each serving as the color modes of the peaking display in the present exemplary embodiment, will be described below.

FIG. 7 illustrates the types of the modes for display by the display unit 105 when the peaking display function is enabled.

Mode 1 displays an image with an emphasized luminance component of an edge component. An input image, which is input from the image input unit 103, is a color image including luminance and chrominance. In this mode, the composite processing is performed by adding an enhanced edge component to a luminance component of this input image as a luminance component.

Mode 2 displays an image with a colored edge component. In this mode, when an enhanced edge component is present (a value is not "0"), the composite processing is performed by referring to the luminance and chrominance values set beforehand as an edge component, and then replacing the luminance and chrominance values of a color input image, which is input from the image input unit 103, with each of the values referred to.

Mode 3 displays a whole image in monochrome. In this mode, the composite processing is performed by adding an enhanced edge component as a luminance component to a luminance component of a color input image which is input from the image input unit 103. Further, a chrominance component is replaced with a fixed value to obtain a monochrome image. For example, when an image is 8-bit data, a monochrome image is obtained by setting a chrominance value to a value of 0×80.

Mode 4 displays only an edge component in color. In this mode, when an enhanced edge component is present (a value is not "0"), the composite processing is performed by replacing the luminance and chrominance values set beforehand as an edge component with the luminance and chrominance values of a color input image input from the image input unit 103, respectively. As for a part where no edge component is present (a value is "0"), a chrominance value is replaced with a fixed value to generate a monochrome image. For example, when an image is 8-bit data, a chrominance value is replaced with a value of 0×80.

Figure 8:
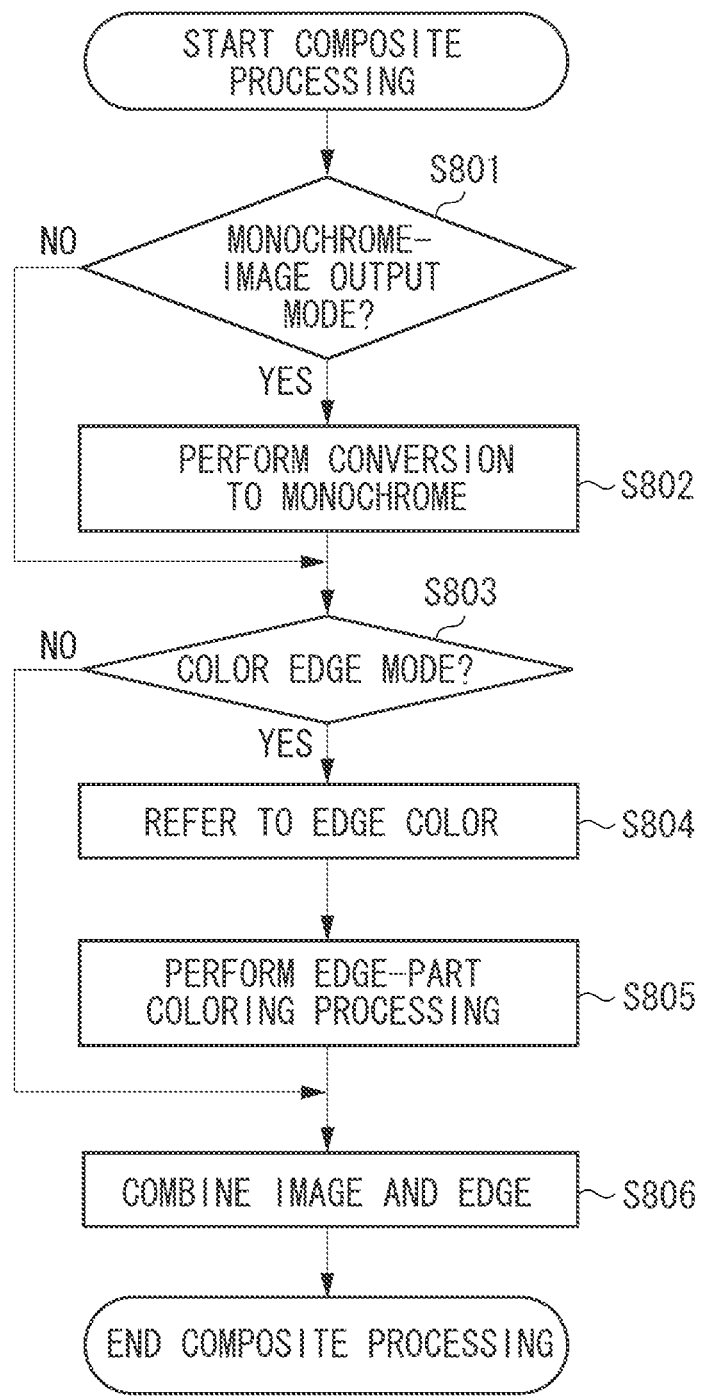
FIG. 8 is a flowchart of composite processing according to the second exemplary embodiment.

FIG. 8 illustrates a flowchart according to the composite processing of the present exemplary embodiment.

The flowchart in FIG. 8 illustrates a processing procedure to be executed by the control unit 101 controlling each processing block. More specifically, programs stored in a memory (ROM) included in the control unit 101 are decompressed into another memory (RAM) and the CPU of the control unit 101 executes the read program to implement the processing.

As illustrated in FIG. 8, at first, in step S801, the control unit 101 determines whether a mode for outputting a monochrome image is set, after starting the composite processing. If the mode for outputting a monochrome image is set (Yes in step S801), then in step S802, chrominance of an input image is converted to a monochrome image. The operation proceeds to step S803, when the mode for outputting a monochrome image is not set (No in step S801).

Next, in step S803, the control unit 101 determines whether an edge component is to be displayed in color or monochrome. If a color edge mode for outputting an image with a colored edge component is set (Yes in step S803), then in step S804, an edge-color value set beforehand is referred to. Next, in step S805, the edge-color value is reflected on edge data. More specifically, the individual values of luminance Y and chrominance (Cb, Cr) are predetermined as an edge color and the values of luminance Y and chrominance (Cb, Cr) of the edge data are replaced with the predetermined values, respectively. If the color edge mode for outputting an image with a colored edge component is not set (No in step S803), the operation proceeds to step S806, to combine the image and the edge component.

Further, operation for each mode will be described using the flowchart of FIG. 8.

In Mode 1 (combination of color image and monochrome edge), a monochrome image is not output (No in step S801), therefore, the operation proceeds to step S803. Further, the color edge mode is not set (No in step S803), and therefore, the operation proceeds to step S806 to combine an image and an edge component.

In Mode 2 (combination of color image and color edge), a monochrome image is not output (No in step S801), therefore, the operation proceeds to step S803. Further, the color edge mode is set (Yes in step S803), therefore, the control unit 101 refers to the predetermined value of an edge color in step S804 and then reflects the value on edge data in step S805. Afterward, the operation proceeds to step S806 to combine an image and an edge component.

In Mode 3 (combination of monochrome image and monochrome edge), a monochrome image is output (Yes in step S801), therefore, the operation proceeds to step S802 to convert an image into a monochrome image. Further, the color edge mode is not set (No in step S803), and therefore, the operation proceeds to step S806 to combine the monochrome image and an edge component.

In Mode 4 (combination of monochrome image and color edge), a monochrome image is output (Yes in step S801), therefore, the operation proceeds to step S802 to convert an image to a monochrome image. Further, the color edge mode is set (Yes in step S803), therefore, the value of an edge color is referred to in step S804, and then reflected on edge data in step S805. Afterward, the operation proceeds to step S806 to combine an image and an edge component.

According to the present exemplary embodiment, the color modes of the peaking display include four patterns. However, it is not necessary to use all these patterns, and only some of these patterns may be adopted. Further, the value of a color when an edge component is colored can be freely set by a user. When an image and an edge component are to be combined, a blend value may be also provided for composition, instead of using the replacement.

The user can select one of modes that allow the user to choose whether each of an edge component and a part except for the edge component is to be displayed in color or monochrome, by operating the operation unit 102. Further, an input image may be analyzed to automatically select a mode suitable for the image.

Other Exemplary Embodiments

Each process in the flowcharts of the first and second exemplary embodiments of the present invention can be carried out when an image processing device reads a computer program for implementing a function of each process from a memory, and a CPU in the apparatus executes the read computer program.

This program may be configured to carry out a part of the above-described function. Further, this program may be a program capable of carrying out the above-described function when combined with a program already recorded in a computer system, which is a so-called differential file (a differential program).

In addition, all or a part of the function of each process in the flowcharts may be realized by dedicated hardware. Moreover, a program for carrying out the function of each process in the flowcharts may be recorded in a computer-readable recording medium, and this program recorded in the recording medium may be read and then executed by a computer system to perform each process. Furthermore, "computer system" described here includes an operating system (OS) and hardware such as a peripheral.

Here, examples of "computer-readable recording medium" include portable media such as a compact disc read only memory (CD-ROM), a flexible disk, a magneto-optical disk, and a ROM, as well as storage devices such as a hard disk built in a computer system. The examples of "computer-readable recording medium" further include media that hold programs for a predetermined time, such as a volatile memory (RAM) provided inside a computer system. "Computer-readable recording medium" further include a RAM within the computer system which serves as a server or a client when a program is transmitted via a network such as the Internet or a communication line such as a telephone line.

Further, the above-described program may be transmitted from the computer system including the storage device or the like storing this program, to another computer system via a transmission medium or a transmitted wave in the transmission medium. Here, this "transmission medium" transmitting the program refers to a medium having a function of transmitting information, such as a network (a communication network) represented by the Internet and a communication line represented by a telephone line.

Furthermore, a program product such as a computer-readable recording medium recording the above-described program can be also adopted as an exemplary embodiment of the present invention. The above-described program, recording medium, transmission medium, and program product are included in a category of the present invention.

Although some exemplary embodiments of the present invention have been described above, the present invention is not limited to these exemplary embodiments, within the scope of technical ideas of the present invention, and may be variously modified in the scope of claims.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-097151 filed May 8, 2014, which is hereby incorporated by reference herein in its entirety.

What is claimed is:

1. An image pickup apparatus comprising:
   an image-pickup unit configured to capture an image;
   a display unit configured to display an image at a resolution lower than a resolution at which the image-pickup unit can capture the image; and
   an image processing unit configured to perform image processing for displaying the image captured by the image-pickup unit on the display unit,
   wherein the image processing unit includes
   an extraction section that extracts an edge component from the image,
   an edge processing section that performs processing for enhancing the edge component by performing low-pass filter processing on the edge component after performing full-wave rectification processing on the edge component,
   a combining section that combines the enhanced edge component with the image to generate a composite image, and
   a resolution conversion section that performs resolution conversion of the composite image so as to match a resolution of the composite image with the resolution of the display unit.

2. The image pickup apparatus according to claim 1, wherein the combining section combines the enhanced edge component with a luminance component of the image.

3. The image pickup apparatus according to claim 1, wherein the combining section performs processing for coloring the enhanced edge component.

4. The image pickup apparatus according to claim 1, wherein the combining section combines the enhanced edge component with the image that has been converted into a monochrome image.

5. The image pickup apparatus according to claim 1, further comprising a selecting unit configured to perform selection of whether each of the enhanced edge component and a part other than the edge component is to be displayed in color or monochrome, with respect to the composite image.

6. The image pickup apparatus according to claim 1, wherein, in a case where a peaking display function of enhancing the edge component and displaying the enhanced edge component is disabled, the image processing unit causes the resolution conversion section to perform resolution conversion of the image so as to match a resolution of the image with the resolution of the display unit without causing the edge processing section to perform edge processing, and the display unit displays the image subjected to the resolution conversion.

7. An image pickup method comprising:
capturing an image using an image-pickup unit;
performing image processing for displaying the image captured by the image-pickup unit on a display unit having a resolution lower than a resolution of the image;
displaying the image subjected to the image processing on the display unit;
wherein the performing image processing includes
extracting an edge component from the image,
performing edge processing for enhancing the edge component by performing low-pass filter processing on the edge component after performing full-wave rectification processing on the edge component,
combining the enhanced edge component with the image to generate a composite image, and
performing resolution conversion of the composite image to match a resolution of the composite image with the resolution of the display unit.

\* \* \* \* \*